P. HAAS.
FLUSHING VALVE.
APPLICATION FILED JUNE 1, 1915.

1,185,308.

Patented May 30, 1916.

INVENTOR
Philip Haas
BY
ATTORNEYS

UNITED STATES PATENT OFFICE.

PHILIP HAAS, OF DAYTON, OHIO.

FLUSHING-VALVE.

1,185,308.   Specification of Letters Patent.   Patented May 30, 1916.

Application filed June 1, 1915. Serial No. 31,509.

*To all whom it may concern:*

Be it known that I, PHILIP HAAS, a citizen of the United States, residing at Dayton, in the county of Montgomery and State of Ohio, have invented certain new and useful Improvements in Flushing-Valves; and I do hereby declare the following to be a full, clear, and exact description of the invention, such as will enable others skilled in the art to which it appertains to make and use the same.

My invention consists in the novel features hereinafter described reference being had to the accompanying drawing which illustrates one embodiment of the invention selected by me for purposes of illustration, and the said invention is fully disclosed in the following description and claims.

Figure 1:
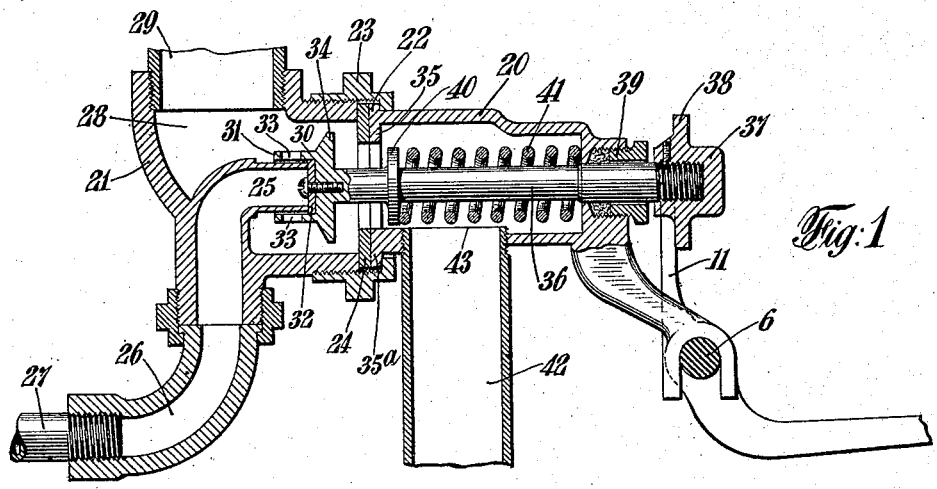
Figure 2:
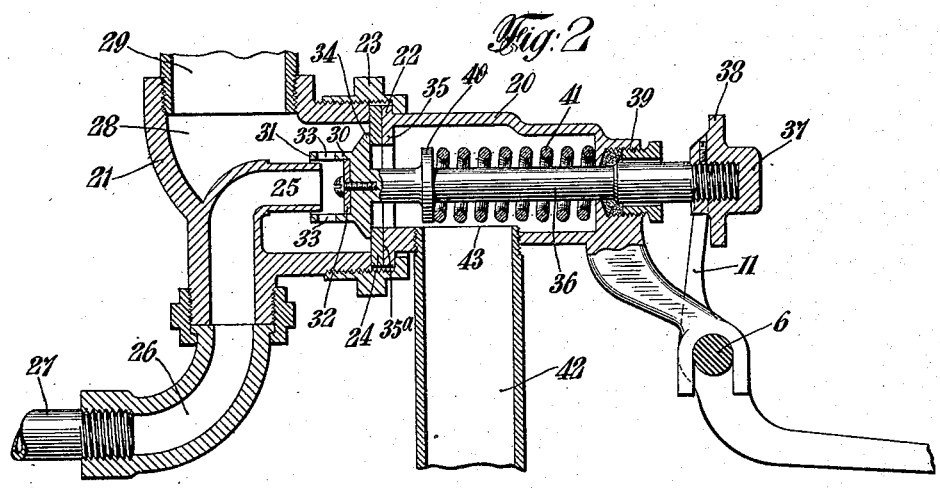
Figure 3:
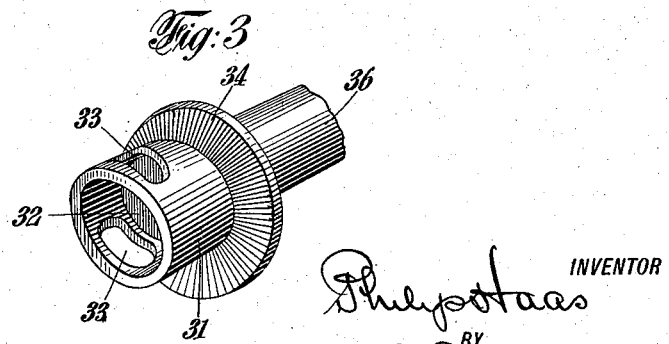

Referring to the said drawing: Figure 1 represents a vertical sectional view of one embodiment of my improved flushing valve, selected by me for the purpose of illustrating the invention, and showing the inlet valve closed and the flushing valve in open position. Fig. 2 is a similar view showing the inlet valve open and the flushing valve closed. Fig. 3 is a detailed perspective view of the valve body forming the inlet and flushing valves, which in this instance are formed in one piece.

In the embodiment of my invention selected by me for purposes of illustration and shown in the accompanying drawing the valve casing is formed in two parts, to wit, the hollow body members, 20 and 21, which are provided with means for clamping their adjacent portions together upon the exterior marginal portions of an annular washer or gasket, 24, which insures a tight joint, the inner portions of the said gasket forming the flushing valve seat as hereinafter described. In this instance, the body member, 20, is provided with an upwardly projecting annular flange, 22, which is engaged by an inwardly projecting flange on a nut, 23, the walls of which are interiorly threaded to engage exterior threaded portions on the body member 21 for the purpose of clamping the body members together upon the exterior marginal portions of the washer or gasket, 24. The body member, 20, is also provided with inwardly extending portions, in this instance, in the general form of an annular flange, 35, provided with a transversely disposed face, 35ª, which engages the washer, 24, and supports the inner portions thereof, while the aperture within the annular portions, 35 and the washer form a communicating aperture between the two body members.

The body member, 21, is provided with a water inlet which is preferably in the form of a hollow stem or nozzle, 25, having its axis concentric with the center of the aperture connecting the two body members, the said stem being open at its inner end and communicating with an inlet opening, 26, at the exterior of the body member, which in this instance is provided with a threaded portion surrounding the aperture, 26, to enable a pipe connection to be secured thereto. In this instance a service pipe, 27, is shown connected with the inlet aperture, 26. The body member, 21, is also provided with an outlet aperture, 28, communicating with the interior of the body member, adapted to be connected by pipe, 29, with a flushing tank in a well known way, the particular form of valve mechanism herein shown being particularly adapted for use in a flushing system in which a flushing tank is employed.

The exterior surface of the tubular stem, 25, is preferably turned so that it is truly cylindrical and forms a guiding surface for portions of the inlet valve and as the casing is made in two parts access may be readily had to this stem through the open end of the body member 21 for turning the same. I prefer to make the inlet and flushing valves integral although this is not essential as they may be separately formed and connected for joint operation, as will be readily understood. In the present instance I have shown a valve body, 30, having a sleeve portion, 31, adapted to fit and slide over the guiding surface of the stem, 25, said sleeve portion being provided at its inner end with an inlet valve formed in this instance by a washer, 32, held in position by a suitable screw, for engaging the inner end of the hollow stem, 25, and closing the aperture therein. The valve and stem are provided with means for permitting the escape of the water when the sleeve is partially retracted so as to remove the valve, 32, from engagement with the hollow stem, 25, and in this instance I have shown the wall of the sleeve provided with discharge apertures, 33, through which the water may pass into the interior of the hollow body, 21.

34 represents the flushing valve which in this instance is formed integrally with the sleeve, 31, and is provided with an annular face to engage the inner portion of the gasket or washer, 24, and close the communicating aperture between the body members 21 and 20. Means are provided for normally holding the valves in such a position that the inlet valve is closed and the flushing valve is open, and means are also provided for simultaneously moving the valves in a direction to open the inlet valve and close the flushing valve. In this instance I have shown the valves secured to or provided with a valve stem, 36, which passes through the communicating aperture between the body members, through the body member 20, and through the guiding aperture in the outer end thereof, which is provided with a stuffing box and gland, 39, for preventing the escape of water around said stem. The valve stem is provided in this instance outside of the valve casing with an enlargement, 37, provided with a flange, 38, adapted to be engaged by an actuating arm, 11, pivotally mounted as indicated at 6, and intended in this instance to be operatively connected with the seat of a closet, although obviously the valve stem, 36, may be actuated in any other desired manner. In this instance, I have also shown the valve stem provided with a shoulder, 40, and surrounded by a coiled spring, 41, one end of which engages said shoulder while the other end engages the outer end of the body member, 20, thus holding the valves in such position that the inlet valve is closed and the flushing valve open, as shown in Fig. 1, in which position no water can enter or pass through the valve casing. Body member, 20, is also provided with a flushing outlet, 43, adapted to be connected by a flushing pipe, 42, with a closet bowl in a well known way.

The operation of the embodiment of my invention herein shown and described is as follows: When the valve stem, 36, is drawn outwardly against the pressure of the spring, 41, as shown in Fig. 2, the inlet valve is opened and the flushing valve, 34, is brought into engagement with the inner marginal portions of the gasket, 24, thus closing the connecting aperture between the body members and preventing the inlet water from passing to the flushing outlet. The water entering through the hollow stem 25 passes through the apertures 33 in the valve sleeve, and thence through the outlet aperture, 28, to the tank where it accumulates and is held until the valve stem is released. The tank is ordinarily closed so that as the water accumulates therein it compresses the air until a pressure corresponding to the pressure of the in-coming water in the main is reached, when the flow ceases. As before stated the outward movement of the valve stem is ordinarily effected by the depression of the closet seat although this is not essential. When the valve stem is released as by the release of the seat or otherwise it is returned to its normal position by the spring, 41, thus closing the inlet valve instantly and opening the flushing valve, 34, thereby permitting the accumulated water in the tank to pass through the communicating aperture between the body members, 21 and 20, in the flange or partition, 35, to the discharge opening, 43, in the body member, 20, and thence through the flushing pipe, 42, to the bowl.

In the drawings, I have shown a brace arm connecting the end of the valve casing with the pivotal support for the actuating arm. This brace arm, however, is not herein particularly described and is not claimed herein, as it forms the subject matter of another application filed by me of even date herewith.

What I claim and desire to secure by Letters Patent is:

1. In a flushing valve the combination with two hollow body members having opposing annular meeting portions and clamping means constructed to force them together without rotating said members with respect to each other, of an annular gasket having its exterior marginal portions clamped directly between the opposing portions of said body members and forming the packing for the joint between said body members, the interior marginal portions of said gasket forming a valve seat, one of said body members being provided with a water inlet and with a water outlet, and the other body member being provided with a flushing outlet on the opposite side of said gasket adapted to be connected to the closet bowl, an inlet valve for normally closing said water inlet, a normally open flushing valve for engaging the valve seat portion of said gasket, and means for simultaneously actuating said valves.

2. In a flushing valve the combination with a hollow body provided with a hollow stem projecting thereinto and having an aperture adjacent to its inner end, said body having two outlet apertures, and an inlet aperture communicating with said hollow stem, and a partition between said outlets, provided with an aperture therein, of a valve having a sliding guiding engagement with said hollow stem for closing the aperture therein, a valve for closing the aperture in said partition, yielding means for holding one of said valves normally in closed position and the other in open position, and means for simultaneously moving said valves to open the one and close the other.

3. In a flushing valve the combination with a hollow body provided with a hollow stem projecting thereinto and having an opening at its inner end, said body having two outlet apertures, and an inlet aperture communicating with said hollow stem, and a partition between said outlets, provided with an aperture therein, of a sleeve in sliding engagement with said hollow stem, having a valve for closing the opening in said stem at its inner end and being provided with lateral discharge openings, a second valve for closing the aperture in said partition, having a fixed relation to said sleeve, yielding means for holding one of said valves normally closed and the other normally open, and actuating means for moving said valves simultaneously against the resistance of said yielding means.

4. In a flushing valve the combination with a hollow body provided with a hollow stem projecting thereinto and having an opening at its inner end, said body having two outlet apertures, and an inlet aperture communicating with said hollow stem, and a partition between said outlets, provided with an aperture therein, of a unitary valve device provided with a sleeve portion in sliding engagement with said hollow stem, and provided with lateral discharge openings and having a valve at its inner end to close the opening in said stem, and a second valve to close the aperture in said partition.

5. In a flushing valve the combination with two hollow body members having opposing annular meeting portions, and means for forcing them together, of an annular gasket having its exterior marginal portions clamped directly between the opposing portions of said body members, and its interior marginal portions forming a valve seat, one of said body members being provided with a hollow stem projecting thereinto in line with the aperture in said gasket and provided with an opening at its inner end forming a water inlet, said body member being also provided with a water outlet, and the other body member being provided with a flushing outlet on the opposite side of said gasket, an inlet valve for normally closing said water inlet, having portions in guiding engagement with said hollow stem, a normally open flushing valve for engaging said valve seat and means for simultaneously actuating said valves.

6. In a flushing valve the combination with two hollow body members having opposing annular meeting portions, and means for forcing them together, of an annular gasket having its exterior marginal portions clamped directly between the opposing portions of said body members, and its interior marginal portions forming a valve seat, one of said body members being provided with a hollow stem projecting thereinto, and having a turned exterior portion concentric with the axis of said valve seat, said stem having an opening at its inner end forming a water inlet, said body member being provided with a water outlet and the other body member being provided with a flushing outlet on the opposite side of said gasket, an inlet valve having cylindrical portions in guiding engagement with said hollow stem, and portions for closing said water inlet, a normally open flushing valve secured to the inlet valve and adapted to engage said gasket when the inlet valve is in open position, a spring normally holding the inlet valve in closed position, and means for actuating said valves simultaneously in a direction to compress said spring.

In testimony whereof I affix my signature.

PHILIP HAAS.

Copies of this patent may be obtained for five cents each, by addressing the "Commissioner of Patents, Washington, D. C."